United States Patent [19]

Tamura et al.

[11] Patent Number: 5,333,104
[45] Date of Patent: Jul. 26, 1994

[54] INVERTER POWER SOURCE

[75] Inventors: Hideki Tamura, Moriyama; Kaoru Furukawa, Hikone, both of Japan

[73] Assignee: Matsushita Electric Works, Ltd., Osaka, Japan

[21] Appl. No.: 63,327

[22] Filed: May 19, 1993

[30] Foreign Application Priority Data

May 22, 1992 [JP] Japan .................................. 4-131129
Aug. 12, 1992 [JP] Japan .................................. 4-215163
Sep. 21, 1992 [JP] Japan .................................. 4-251213

[51] Int. Cl.$^5$ ............................................. H02M 3/335
[52] U.S. Cl. ............................................. 363/19; 363/18
[58] Field of Search .................... 363/18, 19, 22, 131; 331/108 C, 112

[56] References Cited

U.S. PATENT DOCUMENTS

| 4,901,214 | 2/1990 | Hiramatsu et al. | 363/19 |
| 4,956,761 | 9/1990 | Higashi | 363/19 |
| 4,958,268 | 9/1990 | Nagagata et al. | 363/19 |
| 4,961,048 | 10/1990 | Banura | 323/351 |
| 5,103,386 | 4/1992 | Herrmann | 363/21 |
| 5,225,972 | 7/1993 | Sakamoto | 363/18 |

FOREIGN PATENT DOCUMENTS 4208911 9/1992 Fed. Rep. of Germany ........ 363/19

Primary Examiner—Steven L. Stephan
Assistant Examiner—Matthew Nguyen
Attorney, Agent, or Firm—Armstrong, Westerman, Hattori, McLeland & Naughton

[57] ABSTRACT

An inverter power supply includes a DC supply providing a DC voltage from an AC mains, a transformer having primary, secondary, and feedback windings, and a self-excited oscillator energized by the DC supply to generate a high frequency voltage across the primary winding and induces across the secondary winding an output AC voltage for driving a load. The oscillator comprises an FET connected in series with the primary winding. A biasing capacitor is connected in series with the feedback winding across a source-gate path of FET for providing an offset voltage which is additive to a feedback voltage at the feedback winding to give a bias applied to a gate of FET so as to alternately turn on and off FET for self-excited oscillation. Also included is a bias stabilizing circuit which lowers the offset voltage by discharging the biasing capacitor through FET being turned on, thereby driving FET turned on only for substantially a constant ON-time period irrespective of an increase in the DC voltage within a limited range. The power supply is characterized to include a compensation circuit which produces a negative voltage to be superimposed to the offset voltage of the biasing capacitor, thereby enabling to lower the offset voltage negative even when the DC voltage increases over the limited range, thereby keeping the ON-time period of FET substantially constant over a wide range of variations in the DC voltage.

9 Claims, 8 Drawing Sheets

INVERTER POWER SOURCE

BACKGROUND OF THE INVENTION

1. Field of the Invention

The present invention is directed to an inverter power supply providing an output AC power through a coupling transformer for driving a device, and more particularly to an inverter power supply including a self-excited oscillator and operating at a maximum efficiency over a wide range of variations in an input DC voltage.

2. Description of the Related Art

A prior art inverter power supply is proposed in the German Patent Publication DE 42 08 911 A1 (corresponding to U.S. application Ser. No. 848,893). As represented in FIG. 1, the related art power supply comprises an AC-to-DC converter 10' providing a rectified and smoothed DC voltage from AC mains, a transformer 20' having a primary winding 21', a secondary winding 22', and a feedback winding 23', and a self-excited oscillator energized by the DC voltage to generate a high frequency voltage across the primary winding 21' and induce across the secondary winding 22' a resulting output AC voltage for driving a load. The oscillator comprises an FET transistor 31' connected in series with the primary winding 21' across the DC voltage and driven to turn on and off by the high frequency voltage induced across the feedback winding 23'. A biasing capacitor 12' is connected in series with the feedback winding 23' across a source-gate path of FET 31' for providing an offset voltage which is additive to the feedback voltage at the feedback winding 23' to give a bias voltage applied to a gate of FET 31' so as to alternately turn on and off FET for self-excited oscillation of providing the high frequency voltage across the primary winding 21'. In order to prevent FET 31' from being turned on for an extended period in response to an increase in the input DC voltage, a bias stabilizing circuit is introduced in the related art power source. The bias stabilizing circuit comprises a resistor 41' and a bypass diode 42' connected in circuit to lower the offset voltage by discharging the biasing capacitor 12' through FET 31' being turned on, so as to correspondingly lower the bias voltage to the gate of FET 31', thus enabling FET 31' to turn on only for substantially a constant ON-time period irrespective of increase in the input DC voltage. In other words, since the increased input DC voltage will increase the high frequency feedback voltage, the resulting bias voltage has an elongated time period in which the bias voltage exceeds a threshold voltage of FET 31', which in the absence of the above bias stabilizing circuit, would act to extend the ON-period of FET 31' with corresponding increase in a current flowing through FET 31' and therefore bring an undesired switching loss. In this sense, the related art power supply is found satisfactory in minimizing a switching loss and operating efficiently.

The above operation of the bias stabilizing circuit is easily understood with reference to FIGS. 2 and 3 which illustrate waveforms of the bias voltage $V_B$ applied to the gate of FET 31', offset voltage $V_{OFF}$, threshold voltage $V_{TH}$, and a drain supply voltage $V_{DD}$ Of FET 31'. FIG. 2 illustrates a condition where the prior power supply operates with the input DC voltage of a regular level. When the DC voltage increases to some extent with a resulting increase in the feedback voltage, the offset voltage $V_{OFF}$ is correspondingly lowered, as shown in FIG. 4, by the discharging of capacitor 12' through the bias stabilizing circuit of resistor 41' and diode 42' and through FET 31' so as to lower the bias voltage $V_B$ (which is the feedback voltage plus offset voltage $V_{OFF}$), thereby preventing the elongation of the ON-period of FET 31' during which the bias voltage $V_B$ exceeds the threshold voltage $V_{TH}$. This means that when the input DC voltage increases to momentarily elongate the ON-period of FET 31', the offset voltage $V_{OFF}$ responds to be lowered in compensation for the increase in the feedback voltage acting in the direction of elongating the ON-period of FET 31' and therefore lower the bias voltage $V_B$ for preventing FET 31' from keeping turned on for an extended ON-period and operating the power supply efficiently irrespective of the increase in the input DC voltage.

However, a problem still exists in this related art power supply in that the bias stabilizing circuit is effective only for a limited range of the input DC voltage increase and fails to lower the bias voltage further in compensation for an increase in the DC voltage beyond the limited range due to the presence of a parasitic diode 32' inherent to FET 31'. That is, when the input DC voltage increases further with an attendant increase in the feedback voltage to such an extent that the ON-period of FET is elongated to make the drain supply voltage $V_{DD}$ negative relative to the ground level as indicative of that the primary winding 21' induces the voltage greater than the input DC voltage, the parasitic diode 32' constitutes a closed loop of flowing a current caused by such negative voltage through the primary winding 21', the input DC voltage source 10' and the parasitic diode 32', whereby the drain supply voltage $V_{DD}$ is fixed to around the ground level and is prohibited from going negative. With this result, the offset voltage $V_{OFF}$ is not allowed to go negative, which means that the bias voltage $V_B$ is not lowered enough to compensate for the increase in the feedback voltage, i.e., in the input DC voltage. Consequently, there appears an extended ON-period in which the bias voltage $V_B$ exceeds the threshold voltage $V_{TH}$ so as to keep FET 31' turned on for an extend period accompanied with a correspondingly increased drain current $I_D$ through FET 31', as shown in FIG. 4 Thus, the related art power supply fails to operate efficiently and suffers from considerable switching loss when the input DC voltage increases to a great extent. To eliminate the above insufficiency, it may be deemed effective to limit the feedback voltage induced at the feedback winding either by reducing the number of turns thereof or by increasing the number of turns for the primary winding. However, such scheme is found not practical because of that the number of turns of the feedback winding cannot be reduced to less than one turn and that there arises another difficulty in obtaining suitable secondary voltage when the primary winding is designed to have an large number of turns.

SUMMARY OF THE INVENTION

The above insufficiency has been eliminated in the present invention which provides an improved inverter power supply. The improved inverter power supply in accordance with the present invention comprises a DC supply providing a rectified and smoothed DC voltage from an AC power source, a transformer having a primary winding, a secondary winding, and a feedback winding, and a self-excited oscillator energized by the DC supply to generate a high frequency voltage across the primary winding and induces across the secondary winding a resulting output AC voltage for driving a load. The oscillator comprises an FET transistor connected in series with the primary winding across the DC supply. A biasing capacitor is connected in series with the feedback winding across a source-gate path of the FET for providing an offset voltage which is additive to a high frequency feedback voltage developed across the feedback winding to give a bias voltage applied to a gate terminal of the FET so as to alternately turn on and off the FET for self-excited oscillation. Also included is a bias stabilizing circuit which lowers the offset voltage by discharging the biasing capacitor through the FET being turned on, thereby driving the FET turned on only for a short ON-time period irrespective of an increase in the DC voltage within a limited range. In order to compensate for a further increase in the DC voltage beyond this limited range, the inverter power supply of the present invention includes a bias compensation circuit which produces a negative voltage to be superimposed to the offset voltage of the biasing capacitor, thereby enabling to lower the offset voltage negative even when the DC voltage increases over the limited range. In this manner, the bias voltage can be lowered sufficiently in well compensation for the great increase in the input DC voltage, assuring to maintain the ON-time period of the FET substantially constant over a wide range of the input DC voltage variations.

Accordingly, it is a primary object of the present invention to provide an improved inverter power supply which is capable of operating at a maximum efficiency with a minimum switching loss over a wide range of the input DC voltage.

In a preferred embodiment of the present invention, the bias compensation circuit comprises an auxiliary feedback winding coupled to the primary winding to induce a voltage of opposite polarity to the feedback voltage across the feedback winding, a smoothing capacitor connected in series with a diode across the auxiliary feedback winding for smoothing the voltage induced across the auxiliary feedback winding and superimposing a resulting smoothed voltage as the negative voltage to the offset voltage in order to lower the offset voltage when the FET is turned on. With this circuit configuration, it is readily possible to reduce the offset voltage by a voltage proportional to the feedback voltage, i.e., the input DC voltage, assuring to give a suitable bias voltage to the FET in conformity with the input DC voltage of different levels for maintaining to turn on the FET for a limited constant ON-period irrespective of the input DC voltage variation, which is therefore another object of the present invention.

In another preferred embodiment, the bias compensation circuit comprises a blocking diode which is connected in series between the drain terminal and the bias stabilizing circuit in an opposite direction with respect to the parasitic diode of the FET such that a current due to a negative going voltage developed at the primary winding is blocked from flowing through the DC voltage source and through the parasitic diode, thereby permitting a drain source voltage at the drain terminal of the FET to be kept negative in response to the negative-going voltage and therefore permitting the biasing capacitor to discharge through a bypass diode of the bias stabilizing circuit, the blocking diode, and the FET transistor for lowering the offset voltage even to negative. Thus, it is possible to lower the bias voltage sufficiently and satisfactory in conformity with the increase in the input DC voltage over a wide range simply by the addition of the blocking diode in the circuit, which is therefore a further object of the present invention.

A return resistor is preferably connected in parallel with the blocking diode for discharging a parasitic capacitor inherent to the FET transistor through the return resistor to the oscillator when the FET transistor is turned off. With the addition of the return resistor, the parasitic capacitor in enabled to discharge through the return resistor in a bypass manner across the blocking diode during the OFF-period of the FET, thereby preventing the parasitic capacitor from discharging through the FET during the ON-period of the FET and therefore eliminating the switching loss which would otherwise result from the discharging of the parasitic capacitor during the on-period of FET for further increased efficiency, which is therefore a still further object of the present invention.

In the power supply provided with the blocking diode, it is preferred to include a voltage dividing resistor which is connected between a source terminal of the FET and the biasing capacitor so as to increase a threshold voltage of the FET in proportion to an increased drain current flowing through the voltage dividing resistor and the FET at the time of starting the circuit. The increased drain current results from an elongated ON-period of the FET which occurs at a start of the power supply and will develop undesired flyback voltage of relative high level across the FET at a subsequent OFF-period thereof. However, with the addition of the voltage dividing resistor in series with the FET, the resistor can develop a corresponding voltage in response to the increase current flowing through the FET and raise the threshold voltage instantaneously for shortening the ON-period of the FET, thereby reducing the undesired flyback voltage and therefore enabling to use the FET of relatively low breakdown voltage, which is therefore a still further object of the present invention.

The power supply with the blocking diode may be provided with a bipolar transistor which is connected in a gate-source path of the FET in such a manner as to shunt the gate-source path when the FET sees a current exceeding a predetermined level. To this end, a current sensing resistor is connected between the source terminal of the FET and an emitter terminal of the bipolar transistor. The bipolar transistor is connected in circuit with its gate terminal connected to a point between the current sensing resistor and the source terminal of FET so as to become conductive when the current sensing resistor sees a current exceeding the predetermined level and shunt the gate-source path of the FET to thereby turn it off. Also in this circuit arrangement, it is equally possible to shorten ON-period of FET in response to the increased current flowing through FET at the start of the circuit for reducing the flyback voltage occurring at the subsequent OFF-period of FET and enabling to use the FET of relatively low breakdown voltage, which is therefore a more object of the present invention.

These and still further objects and advantageous features of the present invention will become apparent from the following description of the preferred embodiments when taken in conjunction with the attached drawings.

DETAILED DESCRIPTION OF THE PREFERRED EMBODIMENTS

An inverter power supply of the present invention is adapted in use to be coupled to an AC mains of fixed low frequency in order to produce therefrom a high frequency voltage which is applied to a load through a suitable rectifier. The power supply is designed to operate consistently over a wide voltage range of the AC mains, for example, 100 to 240 V. An AC-to-DC converter is included to provide a DC voltage which is rectified and smoothed from the AC mains and which varies with the AC mains of different voltages.

Figure 1:
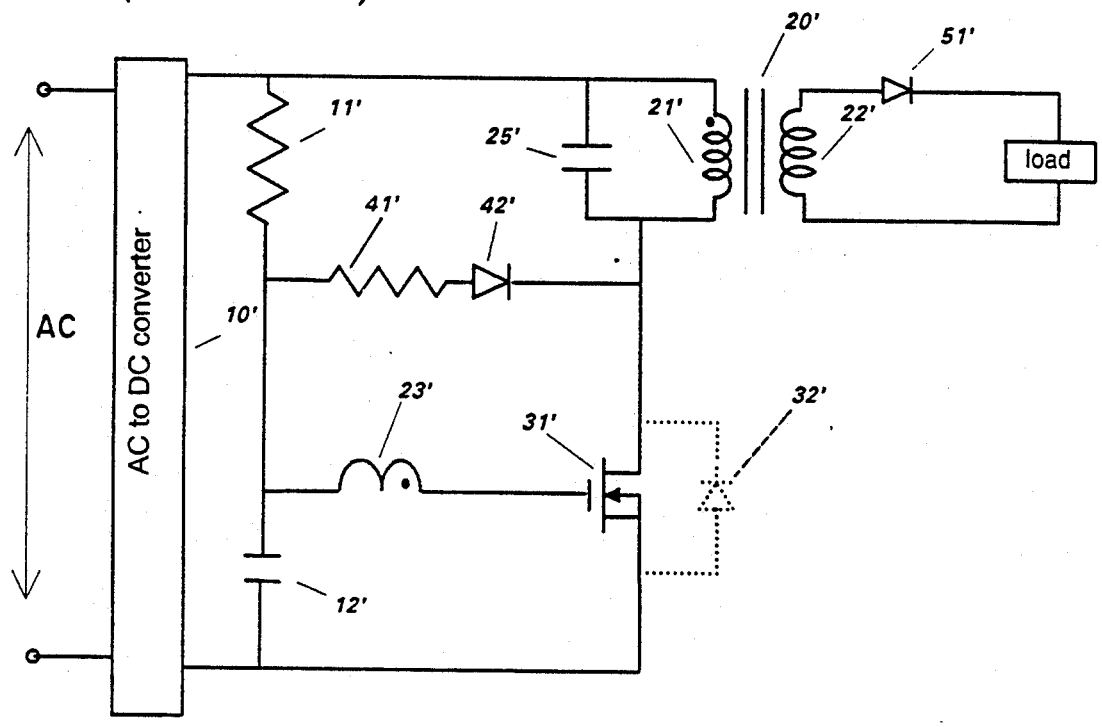
FIG. 1 is a circuit diagram of a prior power supply.
Figure 2:
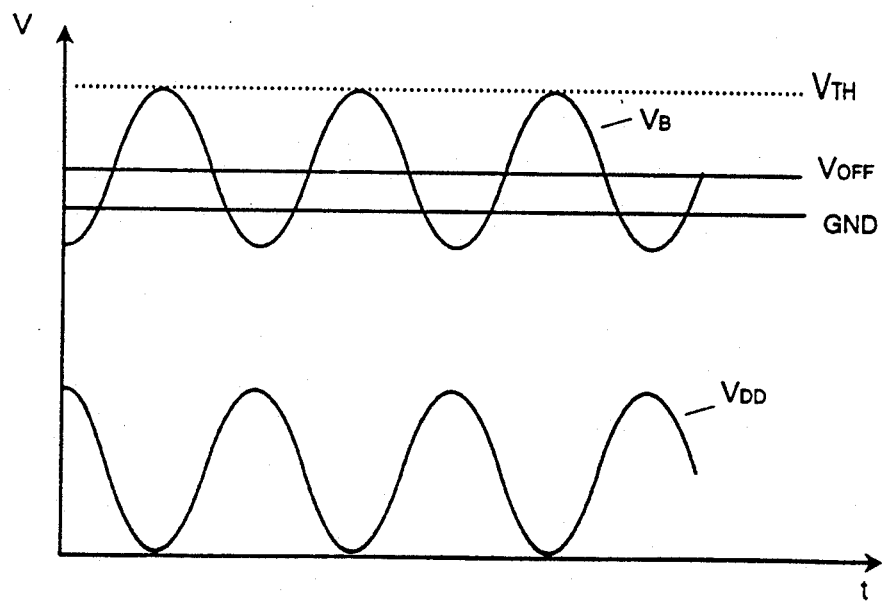
FIGS. 2 to 4 are waveform charts illustrating the operations of the prior power supply, respectively.
Figure 3:
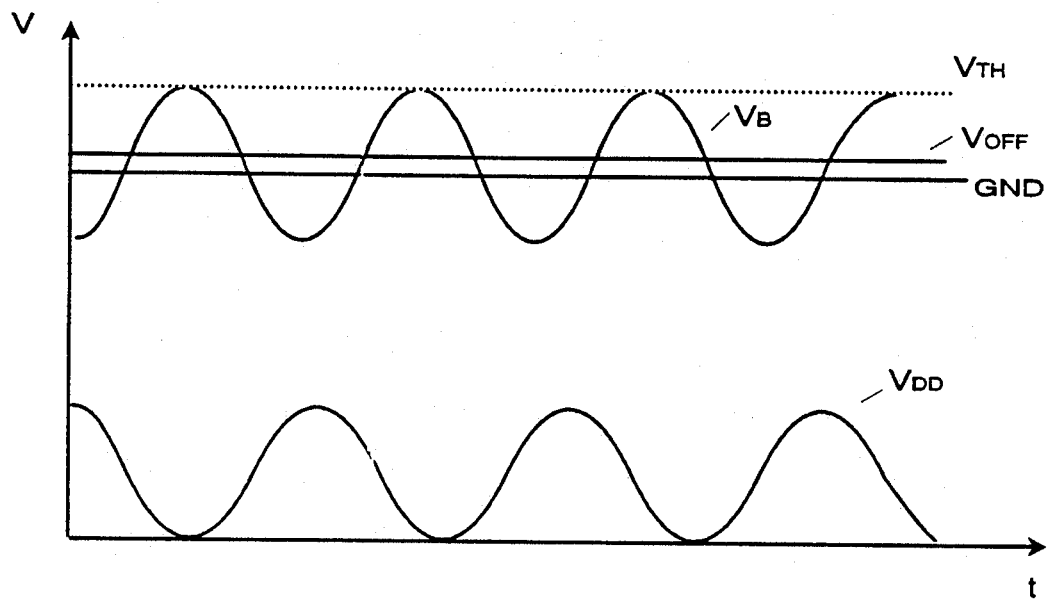
Figure 4:
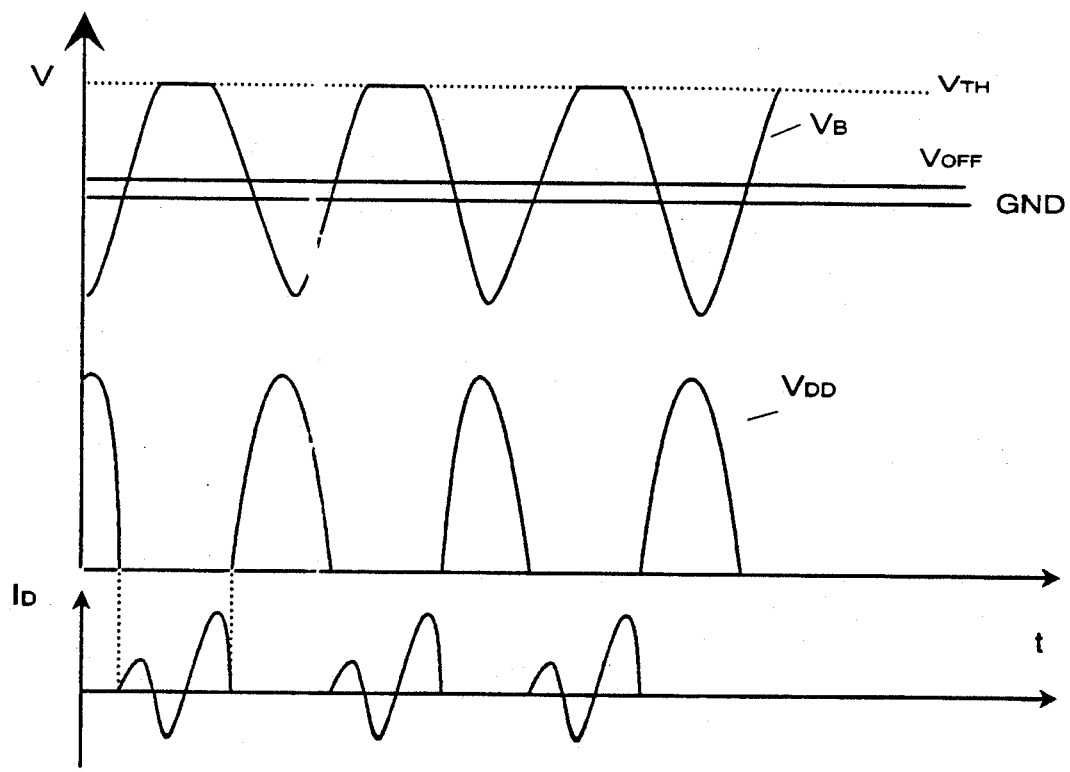
Figure 5:
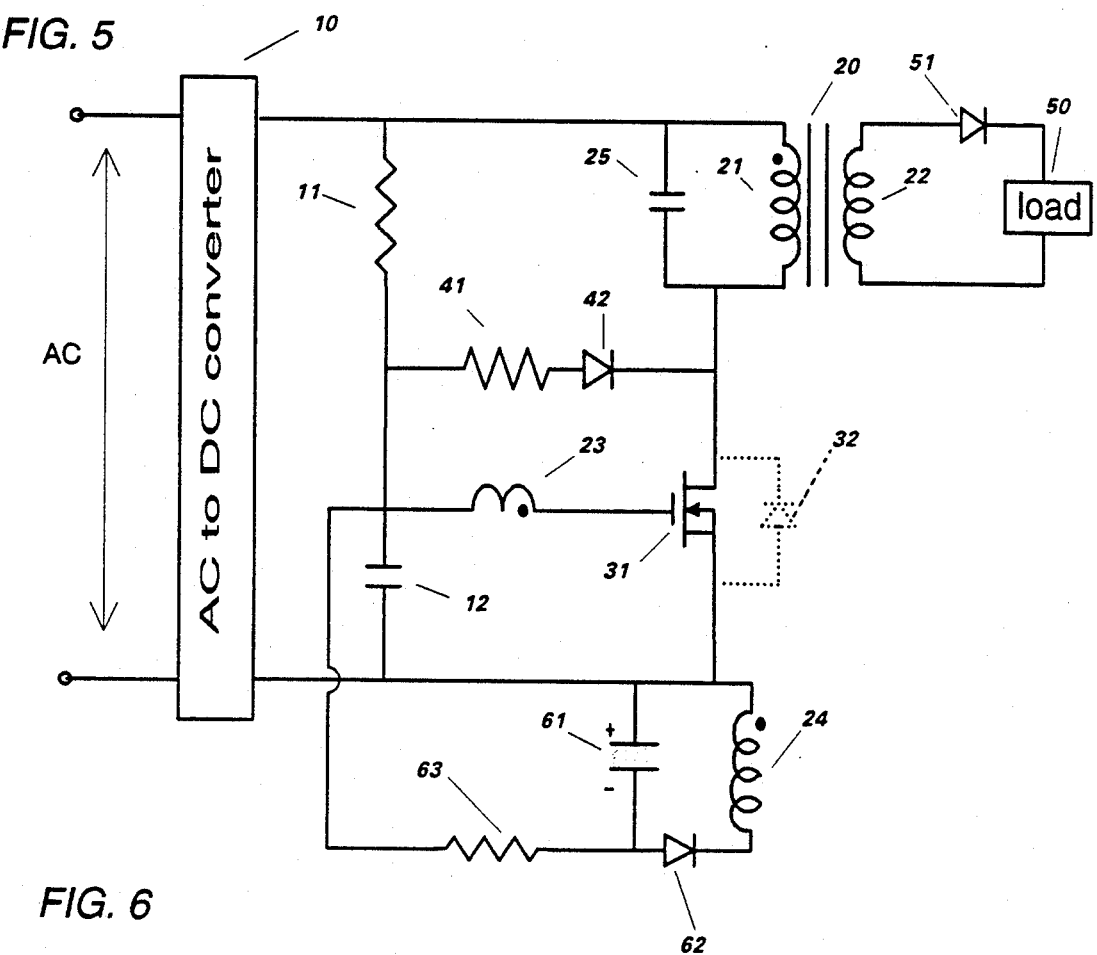
FIG. 5 is a circuit diagram of an inverter power supply in accordance with a first embodiment of the present invention.
Figure 6:
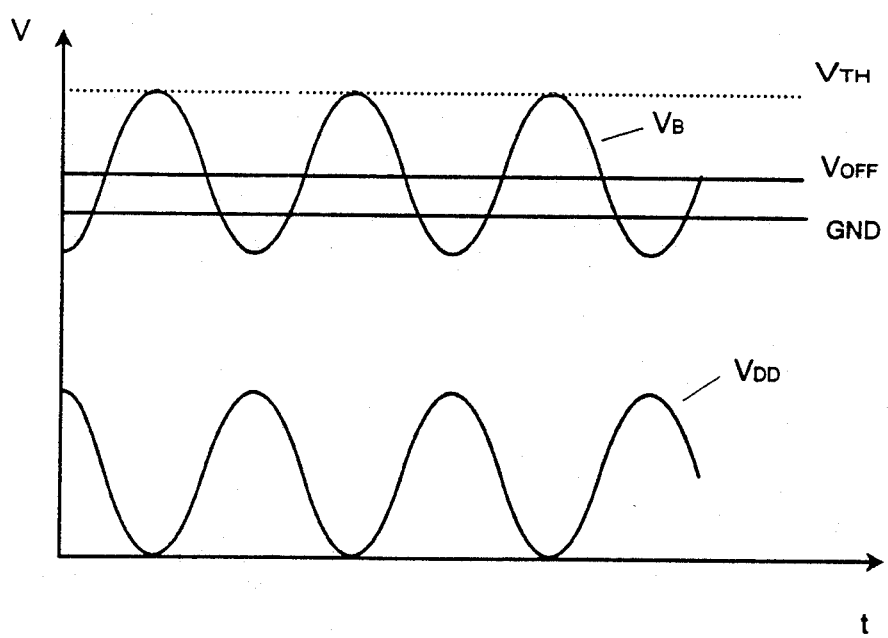
FIGS. 6 and 7 are waveform charts illustrating the operations of the inverter power supply of FIG. 5, respectively.
Figure 7:
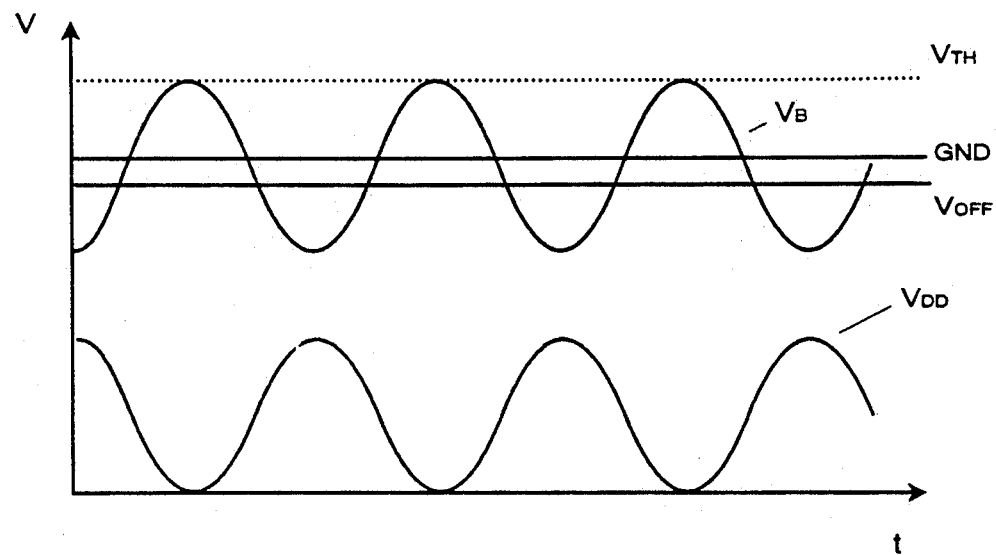

First Embodiment <FIGS. 5 to 7>

Referring now to FIG. 5, there is shown an inverter power supply in accordance with a first embodiment of the present invention. The power supply comprises the AC-to-DC converter as a DC supply 10 providing the DC voltage which is rectified and smoothed from the AC mains. Coupled to the DC supply 10 is a self-excited oscillator which includes a transformer 20 for converting the DC voltage from the DC supply 10 into a high frequency AC voltage which is applied to a load 50 for energization thereof. The transformer 20 has a primary winding 21, a secondary winding 22, and a feedback winding 23. The primary winding 21 is connected in parallel with a capacitor 25 to form a parallel resonant circuit which is connected in series with an FET transistor across the DC source 10 to constitute the self-excited oscillator. The secondary winding 22 is connected through a diode 51 to energize the load 50. Also included in the power supply are a series circuit of a starting resistor 11 and a biasing capacitor 12 connected across the DC supply 10, and a bias stabilizing circuit composed of a resistor 41 and a bypass diode 42 connected in series between a drain terminal of FET 31 and a first end of the feedback winding 23. The feedback winding 23 has a second end connected to a gate terminal of FET 31, while the first end thereof is connected to a point between the starting resistor 11 and the biasing capacitor 12. The biasing capacitor 12 is charged at a start of the power supply by the DC voltage to give a bias voltage so as to firstly turn on FET 31, as will be discussed later. After the power supply goes into a stable operation mode of providing a high frequency resonant voltage across the primary winding 21, the biasing capacitor 12 acts to give an offset voltage $V_{OFF}$ which is added to a high frequency feedback voltage induced across the feedback winding 23 to provide a bias voltage applied to a gate terminal of FET 31 for alternately turning on and off FET 31.

Further included in the power supply is a bias compensation circuit which comprises an auxiliary feedback winding 24, a smoothing capacitor 61 connected across the auxiliary feedback winding 24, and a diode 62. The auxiliary feedback winding 24 is connected in parallel with the biasing capacitor 12 and is magnetically coupled to the primary winding 21 in such a manner as to induce a voltage which is opposite in polarity to the feedback voltage at the feedback winding 23, and which goes negative when the feedback voltage at the feedback winding 23 acts in the direction of turning on FET 31. The voltage induced at the auxiliary feedback winding 24 is rectified and smoothed to provide a negative voltage across the smoothing capacitor 61. The resulting negative voltage is applied through a resistor 63 across the biasing capacitor 12, when the power supply is in the stable operation mode, to lower the offset voltage to be added to the feedback voltage at the feedback winding 23.

Operation of the inverter power supply will be now discussed. Upon energization of the power supply, the DC supply 10 provides the DC voltage across the series circuit of the starting resistor 11 and the biasing capacitor 12 so as to charge the biasing capacitor 12 through the resistor 11. When the biasing capacitor 12 is charged to give the bias voltage exceeding a threshold voltage $V_{TH}$ Of FET 31, FET 31 is firstly turned on to supply energy to the resonant circuit of the primary winding 21 and the capacitor 25 from the DC supply 10. Upon this occurrence, the capacitor 12 begins discharging through the resistor 41, the diode 42, and FET 31 to lower the bias voltage. After the bias voltage is lowered below the threshold voltage $V_{TH}$, FET 31 is caused to turn off after which the resonant circuit responds to oscillate to thereby induce the corresponding feedback voltage at the feedback winding 23. When thus induced feedback voltage increases the bias voltage again over the threshold voltage $V_{TH}$, FET 31 is turned on to energize the resonant circuit and at the same time to discharge the capacitor 12 through the resistor 41, diode 42, and FET 31. The above starting cycle is repeated several times until the voltage across the biasing capacitor 12 settles to substantially a constant level, after which FET 31 is alternately turned on and off in a self-excited manner by the high frequency feedback voltage induced at the feedback winding 23. Thus, the power supply goes into the stable operation mode for providing a high frequency resonant voltage across the primary winding 21, as shown in FIG. 6, which shows waveforms of the offset voltage $V_{OFF}$ given by the biasing capacitor 12, the bias voltage $V_B$ which is the sum of the feedback voltage and the offset voltage $V_{OFF}$, and a drain supply voltage $V_{DD}$ of FET 31 indicative of the high frequency resonant voltage developed across the primary winding 23. As shown in FIG. 6, the bias voltage $V_B$ is sinusoidal and is out of phase with the drain supply voltage $V_{DD}$ by 90°. It is noted here that the offset voltage $V_{OFF}$ of the biasing capacitor 12 is selected such that, in the stable operation mode, the resulting bias voltage $V_B$ (the offset voltage $V_{OFF}$ plus the feedback voltage) exceeds the threshold voltage $V_{TH}$ substantially only at the peak of the feedback voltage in order to turn on FET 31 only when the drain supply voltage $V_{DD}$ of FET 31 is substantially around zero, as seen in FIG. 6.

The stable oscillation mode can continue even if the input DC voltage increases due to a corresponding voltage increase in the AC mains or a load variation. When the input DC voltage increases, the resonant circuit produces a correspondingly increased resonant voltage across the primary winding 21 and at the same time increases correspondingly the feedback voltage at the feedback winding 23. As the feedback voltage of sinusoidal waveform increases, the resulting bias voltage $V_B$ also of sinusoidal waveform will have an elongated duration in which the bias voltage $V_B$ exceeds the threshold voltage $V_{TH}$ to extend the ON-period of FET 31. However, as the ON-period extends, the biasing capacitor 12 has a correspondingly increased time for discharging through the bias stabilizing circuit of resistor 41 and diode 42, and through FET 31 being turned on so as to correspondingly lower the offset voltage $V_{OFF}$. Also at this time, the negative voltage developed across the auxiliary winding 24 and smoothed by the capacitor 61 is superimposed to the voltage of the capacitor 12 to further lower the offset voltage $V_{OFF}$ in order to pull down the resulting bias voltage $V_B$ below the threshold voltage $V_{TH}$. With this result, the ON-period of FET 31 is prevented from elongated and therefore operates the power supply efficiently by turning on FET 31 for a limited ON-period only when the drain supply voltage $V_{DD}$ of FET 31 is around zero. It should be noted here that the offset voltage $V_{OFF}$ across the biasing capacitor 12 cannot be lowered to negative even when the resonant circuit provides the resulting resonant voltage which is greater than the input DC voltage as a consequence of FET 31 is turned on for an extended period in response to the increased input DC voltage. This is because of that a parasitic diode 32 inherent to FET 31 acts to flow a current as soon as such resonant voltage is produced or the drain supply voltage $V_{DD}$ goes negative, thereby disabling the drain supply voltage $V_{DD}$ to go negative. Consequently, the biasing capacitor 12 is not allowed to discharge to negative, thereby failing to lower the offset voltage $V_{OFF}$ beyond the ground level alone by the bias stabilizing circuit. Nevertheless, the auxiliary feedback winding 24 can, under this circumstance, provide a suitable negative voltage which is superimposed to the voltage of the capacitor 12, thereby enabling to lower the resulting offset voltage $V_{OFF}$ further beyond the ground level to negative. With this result, it is possible to turn on FET 31 only for a limited ON-period irrespective of the input DC voltage increase and therefore operate the power supply at a maximum efficiency. This is shown in FIG. 7 which illustrates like waveforms as in FIG. 6 but shows the offset voltage $V_{OFF}$ lowered beyond the ground level. In this manner, the power supply can operate efficiently over a wide range of the input DC voltage either resulting from a corresponding voltage increase of the AC mains or a load requirement.

It is noted here that the primary winding 21 is designed to have a suitable inductance or the number of turns in conformity with an intended output energy to the load and that the number of turns for the feedback winding 23 is decided upon a ratio of the threshold voltage to the number of turns of the primary winding 21 but to have at least one turn. With this limitation, there may be a problem when, for example, designing the power supply circuit operate on 100 V mains in that the single turn of the feedback winding 23 produce an over voltage which cannot lower the bias voltage sufficient to minimize the ON-period of FET 31, which eventually fails to design the transformer 20. Nevertheless, due to the addition of the auxiliary feedback winding 24 and the associated circuit components, it is readily possible to give a suitable bias voltage for minimizing the ON-period of FET free from the above limitation between the primary winding 21 and the feedback winding 23, therefore assuring flexibility in designing the power supply.

Figure 8:
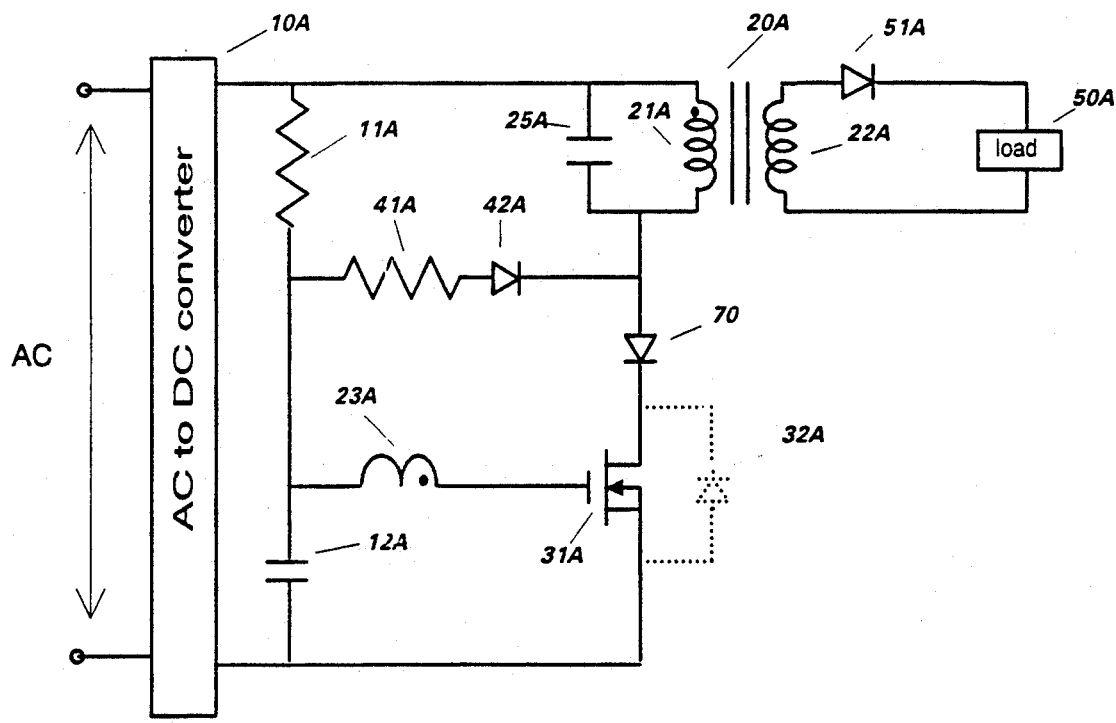
FIG. 8 is a circuit diagram of an inverter power supply in accordance with a second embodiment of the present invention.
Figure 9:
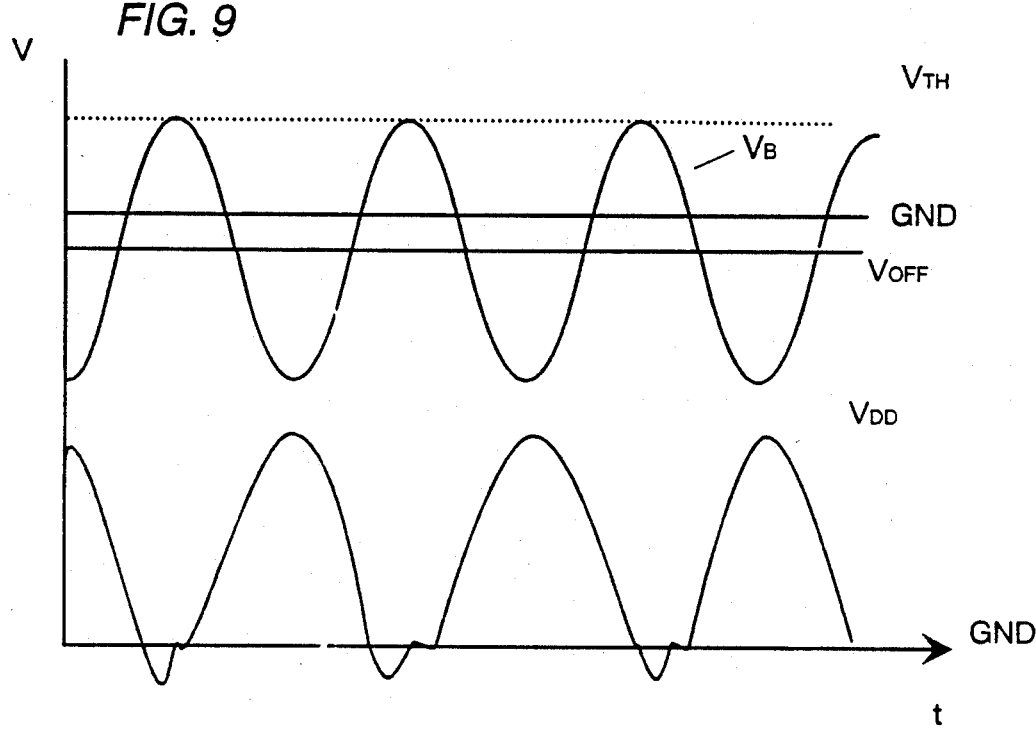
FIGS. 9 and 10 are waveforms chart illustrating the operation of the inverter power supply of FIG. 8.

Second Embodiment <FIGS. 8 and 9>

FIG. 8 illustrates an inverter power supply in accordance with a second embodiment of the present invention. The power supply is identical in circuit configuration to that of the first embodiment except that a blocking diode 70 is included instead of the bias compensation circuit of the auxiliary feedback winding 24, capacitor 61, diode 62, and resistor 63. Like components are designated by like numerals with a suffix letter of "A" in order to avoid duplicate explanation. The blocking diode 70 is inserted between the drain terminal of FET 31A and a bypassing diode 42A in opposite relation to a parasitic diode 32A of FET 31A. The blocking diode 70 blocks a current which would otherwise flow through the parasitic diode 32A when the resonant circuit produces the resonant voltage greater than the input DC voltage in response to the ON-period of FET 31A becoming longer. Thus, the drain supply voltage $V_{DD}$ is permitted to go negative, as shown in FIG. 9, such that the biasing capacitor 12 is also permitted to discharge through the resistor 41 and the bypass diode 42 to lower the offset voltage $V_{OFF}$ to negative under the condition that the drain supply voltage $V_{DD}$ of FET goes negative relative to the ground. Therefore, the power supply of the second embodiment can also operate efficiently over a wide range of the input DC voltage with a minimum switching loss.

Figure 10:
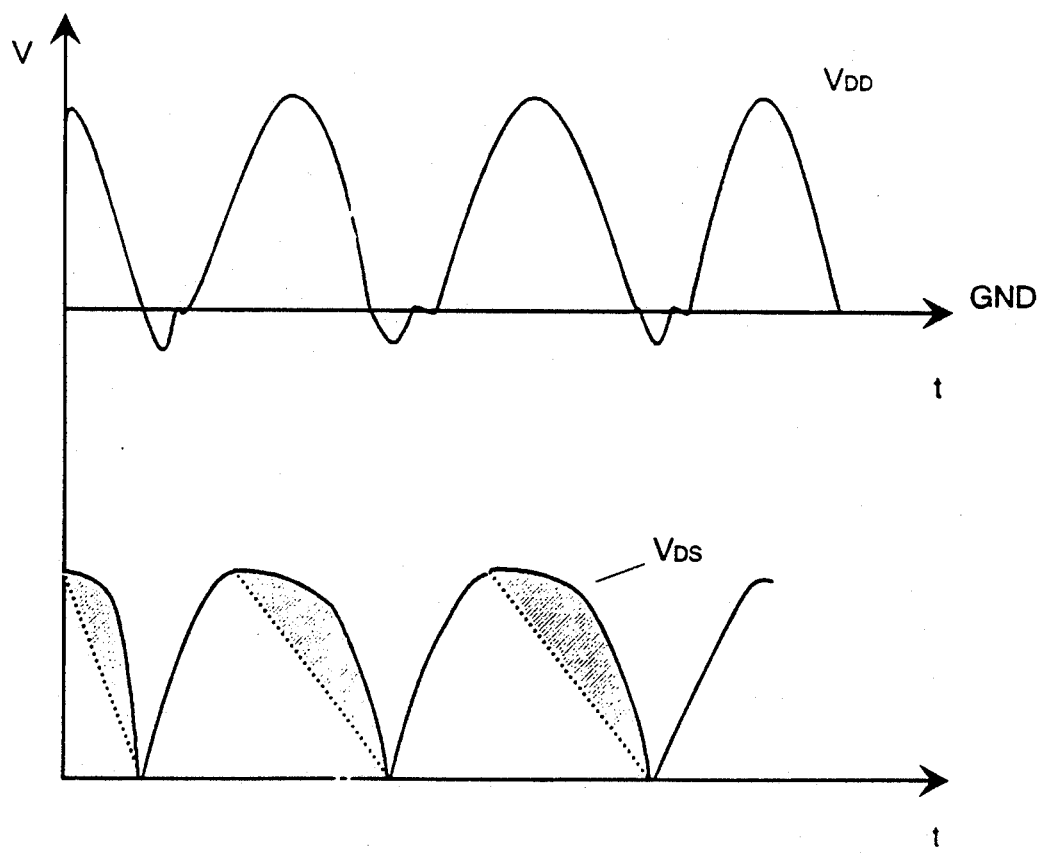
Figure 11:
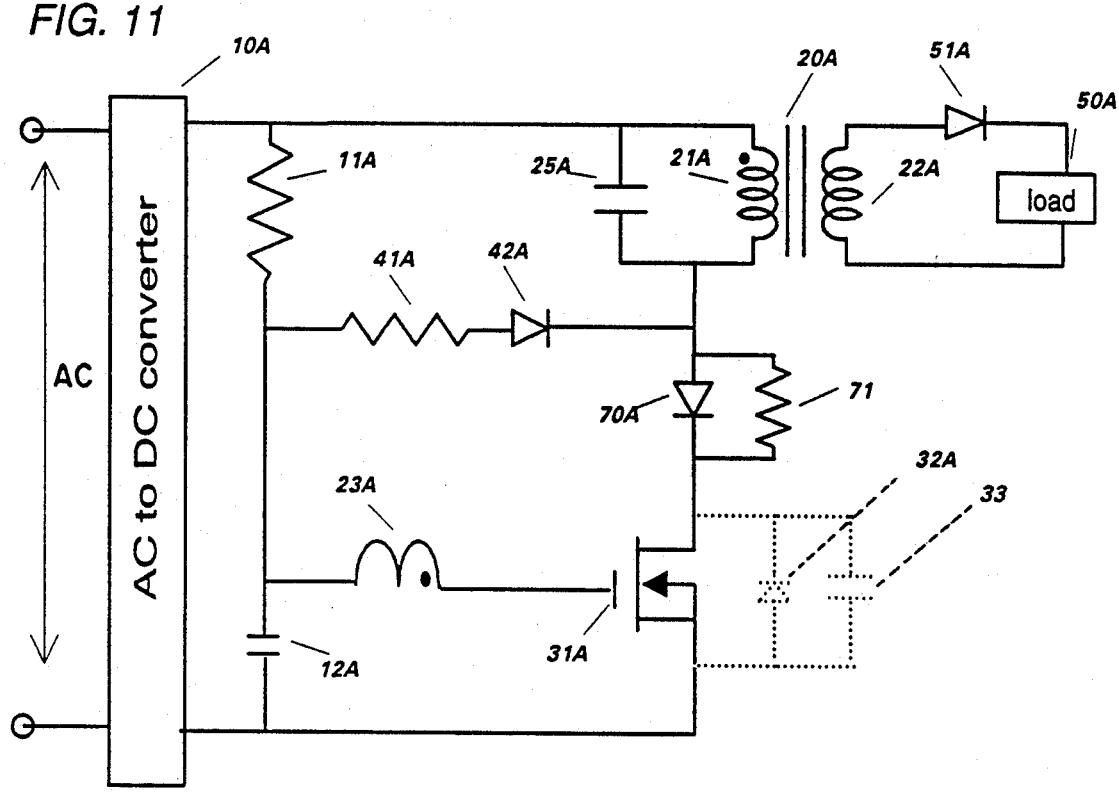
FIG. 11 is a circuit diagram of an inverter power supply in accordance with a first modification of the power supply of FIG. 8.
Figure 12:
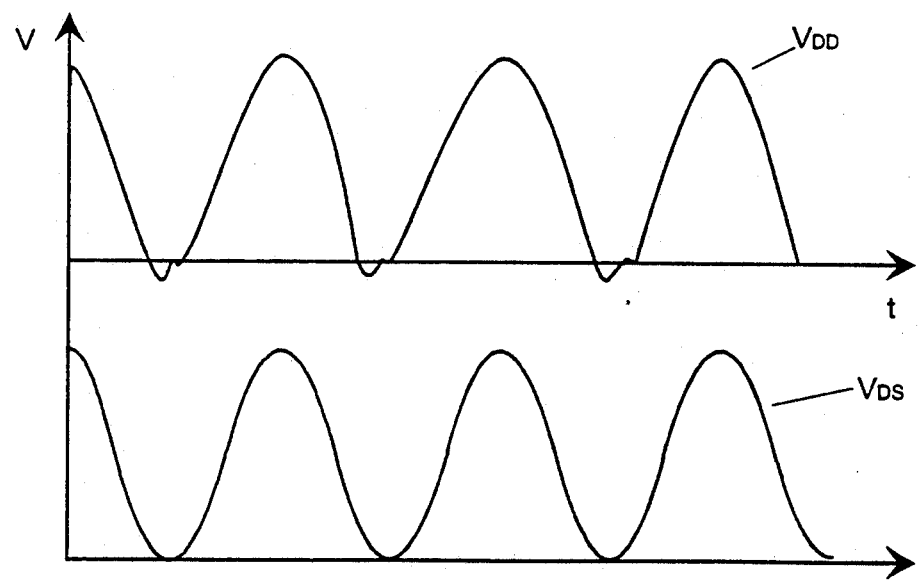
FIG. 12 is a waveform chart illustrating the operation of the inverter power supply of FIG. 11.

In the circuit of FIG. 8, however, there is a problem that a parasitic capacitor 33 inherent to FET 31A is inhibited from discharging due to the presence of the blocking diode 70 during the OFF-period of FET 31A, which retards the drop of a drain-source voltage $V_{DS}$ in relation to the drain supply voltage $V_{DD}$, as shown in FIG. 10 in which hatched area for $V_{DS}$ corresponds to what would be otherwise discharged from the parasitic capacitor 33. With this result, the parasitic capacitor 33 tends to discharge during the ON-period of FET 31A, thereby increasing the current flowing through FET 31A during the ON-period and therefore increasing a switching loss. In order to avoid this problem, a first modification is proposed, as shown in FIG. 11, with the addition of a bypass resistor 71 to the circuit of FIG. 8. The bypass resistor 71 is connected in parallel with the blocking diode 70A so as to allow the parasitic capacitor 33 to discharge through the bypass resistor 71 during the OFF period of FET 31A to return a charge from the parasitic capacitor 33 to resonant circuit of primary winding 21A and capacitor 25A. Thus, the drain-source voltage $V_{DS}$ can easily conform with the drain supply voltage $V_{DD}$, as shown in FIG. 12, to prevent undesired extra accumulation of $V_{DS}$ during the OFF-period of FET 31A which would otherwise increase the current through FET 31A at the next ON-period and therefore to keep the switching loss at a minimum.

Figure 13:
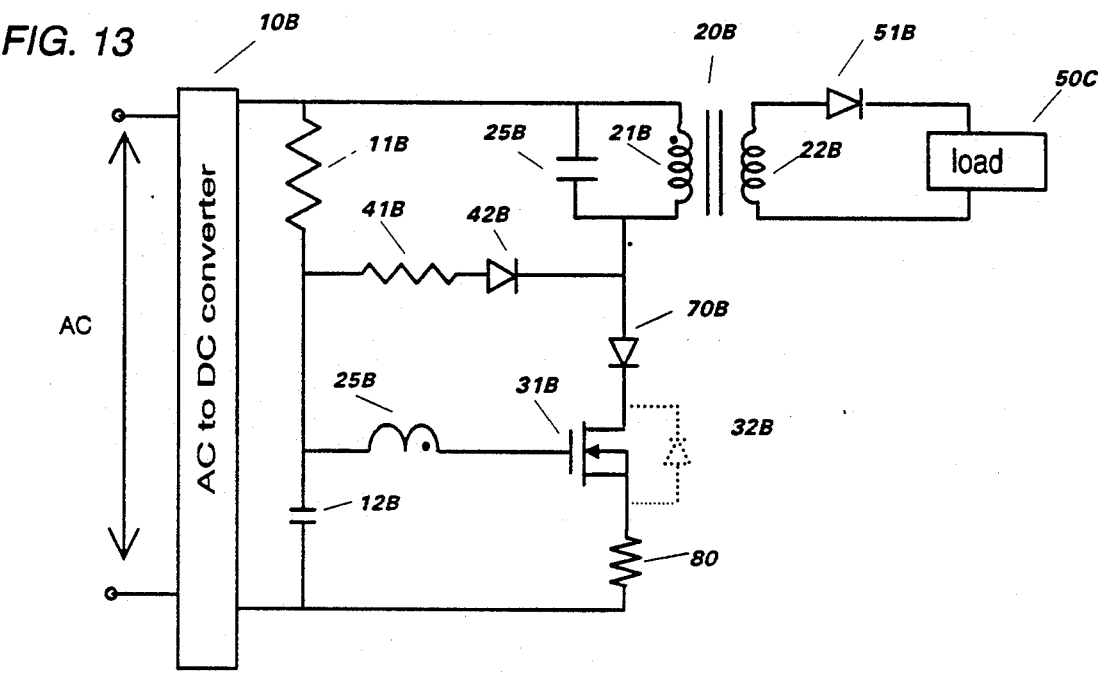
FIG. 13 is a circuit diagram of an inverter power supply in accordance with a second modification of the power supply of FIG. 8.
Figure 14:
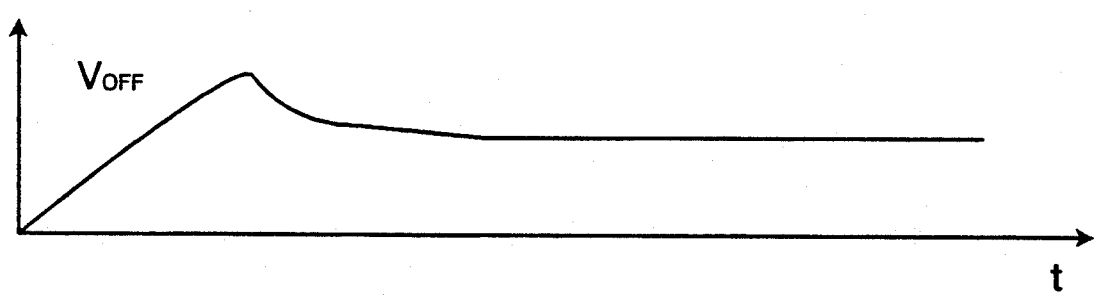
FIG. 14 is a waveform chart illustrating the operations of the inverter power supply of FIG. 13.
Figure 14:
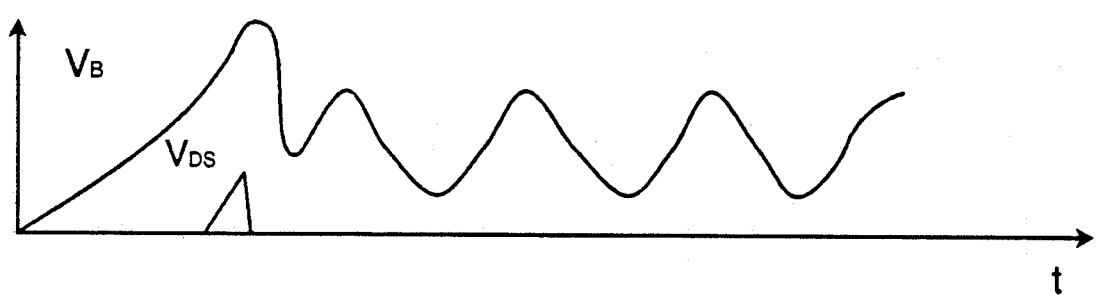
Figure 14:
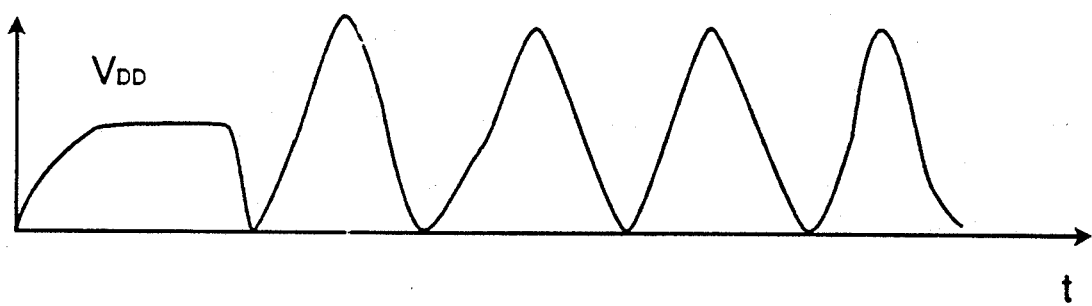
Figure 14:
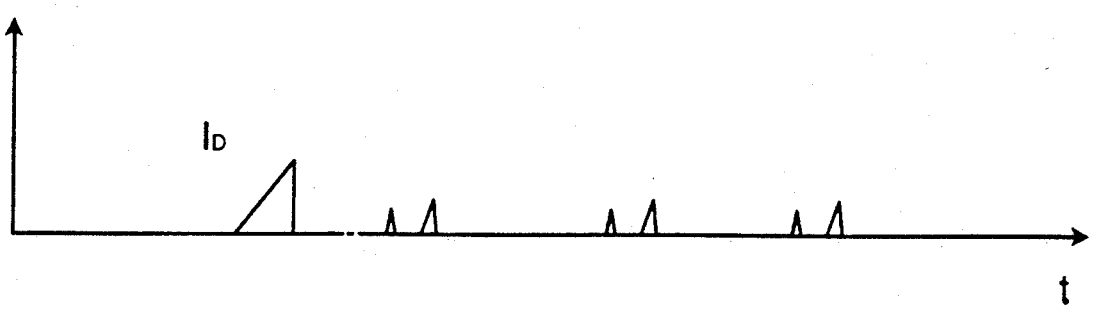

FIG. 13 illustrates a second modification of the circuit of FIG. 8, which is designed to protect FET 31B from an over-voltage developed at the start of the circuit. At the start of the circuit, FET 31B is turned on for a relative long period than in the normal operation mode to have an increased drain current $I_D$, as shown in FIG. 14. With this result, the primary winding 21B of the resonant circuit receives a correspondingly great energy which will act to develop a high level flyback voltage across FET 31B at a subsequent OFF-period of FET 31B. Therefore, FET 31B is required to have a great breakdown voltage for protection against an over-voltage due to the high level flyback voltage. Nevertheless, it is possible with the modification circuit of FIG. 13 to avoid this problem and to reduce the requirement to FET 31B. The modification circuit is identical to the circuit of FIG. 8 except that a resistor 80 is connected between the source terminal of FET 32B and the biasing capacitor 12 or the ground. Like components are designated by like numerals with a suffix letter of "B" to avoid duplicate explanations. The resistor 80 thus connected between the source terminal of FET 31B and the ground will increase the drain source voltage $V_{DS}$ of FET 31B, as shown in FIG. 14, in proportion to a drain current $I_D$ flowing through FET 31B, thereby lowering the gate-source voltage or the threshold voltage of FET 31B correspondingly at the start of the circuit and therefore to shorten the ON-period of FET 31B. With this result, it is possible to reduce the flyback voltage appearing at the subsequent OFF-period of FET 31B and therefore to reduce the breakdown voltage required for FET 31B.

Figure 15:
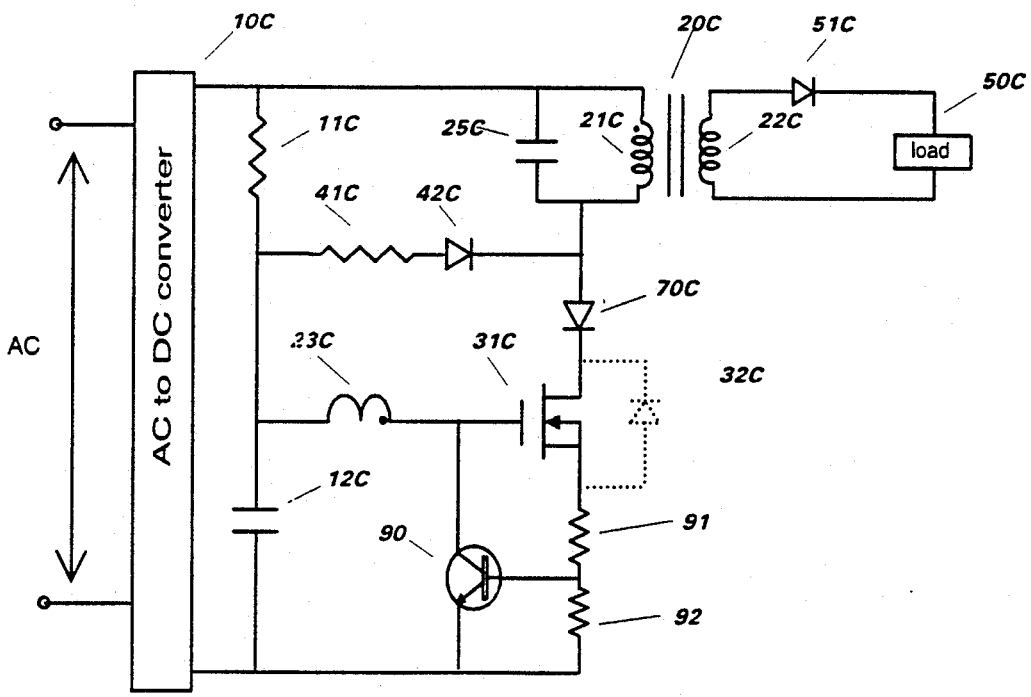
FIG. 15 is a circuit diagram of an inverter power supply in accordance with a third modification of the power supply of FIG. 8.

The above effect of preventing undesired flyback voltage the starting of the circuit can be equally achieved also in a third modification, as shown in FIG. 15, which is identical in circuit configuration to the circuit of FIG. 8 except that a bipolar transistor 90 is connected in a gate-source path of FET 31C with the use of associated resistors 91 and 92. Like components are designated by like numerals with a suffix letter of "C". The resistors 91 and 92 are connected in series between the source terminal of FET 31C and the biasing capacitor 12C or the ground to develop corresponding voltages thereat as the drain current $I_D$ flows therethrough. The transistor 90 has a collector connected between the gate terminal of FET 31C and a feedback winding 23C with the resistor 92 connected in a base-emitter path of the transistor 90. When the drain current $I_D$ increases to flow the resistors 91 and 92 at the time of starting the circuit, a bias voltage is developed across the resistor 92 to cause the transistor 90 to become conductive, which in turn shunts the gate-source path of FET 31C to turn it off for shortening the ON-period of FET 31C at the start of the circuit. With the provision of the transistor 90 in the gate-source path of FET 31C, it is readily possible to reduce the resistance of resistors 91 and 92 while shunting the gate-source path of FET 31C in response to the increase in the drain current $I_D$, which assures to minimize efficiency drop due to the resistors 91 and 92. Further, it is noted that with the use of the shunting transistor 90 makes it possible to turn off FET 31C solely depending upon the drain current $I_D$ at the time of starting the circuit, which avoids undesired variations in surge voltage which would otherwise occur due to possible variations in the number of turns for the feedback winding 23C and in the coupling characteristic between the primary winding 21C and the feedback winding 23C. This is particularly advantageous in contrast to the circuit of FIG. 13 in which there is a chance of delaying the turn off FET 31B due to variations in the number of turns of the feedback winding 23B, i.e., the induced voltage. For instance, if the feedback winding 23B is selected to have the number of turns greater than intended, there would be an elongated period during which the induced voltage exceeds the threshold voltage, thereby delaying the turn off of FET 31B and eventually increase flyback voltage.

What is claimed is:
1. An inverter power supply for driving an electrical device comprising:
   a DC supply providing a DC voltage;
   a transformer having a primary winding, a secondary winding, and a feedback winding;
   a self-excited oscillator comprising a FET transistor which is connected in series with said primary winding across said DC supply and energized by said DC supply to generate a high frequency voltage across said primary winding, a high frequency feedback voltage across said feedback winding and a resulting output AC voltage across said secondary winding, said output AC voltage being applied to a load circuit of said device;
   a biasing capacitor connected in series with said feedback winding across a gate-source path of said FET transistor for providing an offset voltage which is additive to said high frequency feedback voltage developed across said feedback winding to give a bias voltage applied to a gate of said FET transistor so as to alternately turn on and off said FET transistor for driving said self-excited oscillator;
   bias stabilizing circuit which lowers said offset voltage by discharging said biasing capacitor through said FET transistor being turned on, thereby driving said FET transistor turned on only for substantially a constant ON-time period irrespective of an increase in said DC voltage within a limited range; and
   bias compensation means comprising an auxiliary feedback winding coupled to said primary winding and connected in parallel with said biasing capacitor to induce a voltage of opposite polarity to said feedback voltage induced at said feedback winding, said bias compensation means producing a negative voltage and superimposing said negative voltage to said offset voltage, thereby permitting said offset voltage to be lowered to negative so as to correspondingly lower the bias voltage when said DC voltage increases over said limited range.

2. An inverter power supply as set forth in claim 1, wherein said oscillator includes a capacitor connected in parallel with said primary winding to form therewith a parallel resonance circuit for providing said high frequency voltage by resonance.

3. An inverter power supply as set forth in claim 1, wherein said bias stabilizing circuit comprises a bypass diode and a resistor connected in series between a drain terminal of said FET transistor and a first end of said feedback winding, said feedback winding having a second end connected to a gate terminal of said FET transistor, and wherein said bias compensation means further comprises a smoothing capacitor being connected in series with a diode across said auxiliary feedback winding for smoothing said voltage induced at said auxiliary feedback winding and superimposing a resulting smoothed voltage to said offset voltage as said negative voltage when said FET transistor is turned on.

4. An inverter power supply for driving an electrical device comprising:
   a DC supply providing a DC voltage;
   a transformer having a primary winding, a secondary winding, and a feedback winding;
   a self-excited oscillator comprising an FET transistor which is connected in series with said primary winding across said DC supply and energized by said DC supply to generate a high frequency voltage across said primary winding, a high frequency feedback voltage across said feedback winding and a resulting output AC voltage across said secondary winding, said output AC voltage being applied to a load circuit of said device;
   a biasing capacitor connected in series with said feedback winding across a gate-source path of said FET transistor for providing an offset voltage which is additive to said high frequency feedback voltage developed across said feedback winding to give a bias voltage applied to a gate terminal of said FET transistor so as to alternately turn on and off said FET transistor for driving said self-excited oscillator;
   bias stabilizing circuit which lowers said offset voltage by discharging said biasing capacitor through said FET transistor being turned on, said bias stabilizing circuit comprising a bypass diode and a resistor connected in series between a drain terminal of said FET transistor and a first end of said feedback winding, said feedback winding having a second end connected to the gate terminal of said FET transistor;
   a blocking diode connected in series between said drain terminal of said FET transistor and said bias stabilizing circuit in an opposite direction with respect to a parasitic diode of said FET transistor such that a current due to a negative going voltage developed at said primary winding is blocked from flowing through said DC source and through said parasitic diode, thereby permitting a voltage at said drain terminal of said FET to be lowered negative in response to said negative going voltage and therefore permitting said biasing capacitor to discharge through said bypass diode, said blocking diode, and said FET transistor for lowering said offset voltage to negative.

5. An inverter power supply as set forth in claim 4, wherein said oscillator includes a capacitor connected in parallel with said primary winding to form therewith a parallel resonance circuit for providing said high frequency voltage by resonance.

6. An inverter power supply as set forth in claim 4, further including a return resistor connected in parallel with said blocking diode for discharging a parasitic capacitor of said FET transistor through said return resistor to said oscillator when said FET transistor is turned off.

7. An inverter power supply as set forth in claim 4, further including a voltage dividing resistor connected between a source terminal of said FET transistor and said biasing capacitor so as to increase a threshold voltage of said FET transistor in proportion to a current flowing through said voltage dividing resistor when said FET transistor is turned on.

8. An inverter power supply as set forth in claim 4, further including limit switch means which is connected in a gate-source path of said FET transistor so as to shunt the gate-source path when said FET transistor sees a current exceeding a predetermined level.

9. An inverter power supply as set forth in claim 8, wherein said limit switch means comprises a bipolar transistor connected in said gate-source path of said FET transistor and a current sensing resistor connected between said source terminal of said FET transistor and an emitter terminal of said bipolar transistor, said bipolar transistor having a gate terminal connected to a point between said current sensing resistor and the source terminal of said FET so as to become conductive when said current sensing resistor sees a current exceeding said predetermined level and shunt said gate-source path of said FET to turn it off

* * * * *